United States Patent Office 3,163,532
Patented Dec. 29, 1964

3,163,532
MATERIAL FOR ELECTROPHOTOGRAPHIC
PURPOSES
Heinz Schlesinger, Wiesbaden, Germany, assignor, by mesne assignments, to Azoplate Corporation, Murray Hill, N.J., a corporation of New Jersey
No Drawing. Filed Sept. 5, 1961, Ser. No. 135,747
Claims priority, application Germany Sept. 17, 1960
13 Claims. (Cl. 96—1)

Electrophotographic material normally consists of a support on which there is a photoconductor substance, this coating being provided in absence of light with an electrostatic charge. Then, either the material is exposed through a master to light or an image is projected thereon episcopically, whereupon an electrostatic image corresponding to the master is formed. This image is developed by being briefly contacted with a resin powder so that a visible image is formed, which is fixed by heating or by solvent action. In this way, a copy which cannot be rubbed off is obtained electrophotographically.

As the photoconductive coatings, inorganic substances such as selenium, sulfur or zinc oxide, and organic substances such as anthracene or anthraquinone have been employed.

A material for electrophotographic purposes has now been found that consists of a support having a photoconductor coating which comprises one or more organic compounds containing metal atoms and at least one chelate ring. The compounds have the following general formula:

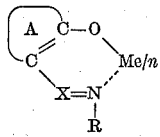

in which X is N, CH or CO, R is H, OH, aryl, substituted aryl or substituted nitrogen, A is a fused aromatic mononuclear or multinuclear ring which may also be substituted by non-ionizing groups, Me is a metal and $n$ is the valence of this metal.

The photoconductor coating is advantageously applied to the supporting material in association with resins.

Suitable supports for the photoconductor coatings are primarily foils made of metal, e.g., aluminum, zinc and copper; cellulose products, e.g., paper and cellulose hydrate; cellulose esters, e.g., cellulose acetate and cellulose butyrate; synthetic substances, e.g., polyolefins such as polyethylene and polypropylene; polyvinyl compounds such as polystyrene, polyvinyl chloride, polyvinylidene chloride, polyacrylonitrile, polyacrylic acid ester and polymethacrylic acid ester; polyesters such as polyterephthalic acid glycol ester, polycarbonates, polyamides and polyurethanes.

If paper is used as the supporting material, it is advisable that it be treated against the penetration of coating solutions, e.g., by treatment with a solution of methyl cellulose or polyvinyl alcohol in water or with a solution of an interpolymer of acrylic acid methyl ester and acrylonitrile in a mixture of acetone and methylethyl-ketone or with solutions of polyamides in aqueous alcohols or with dispersions of such substances.

The compounds suitable as photoconductor coatings in accordance with the present invention can be conceived of as metal complexes of aromatic hydroxyl compounds which possess a grouping capable of complex formation in the ortho position to the hydroxyl group, e.g., —N=N-aryl, —CH=N—OH, —CH=NH, —CH=N—NH—CO-aryl, and —CH=N=N—CH-aryl Compounds of this type which are capable of complex formation are, for example: o-hydroxy-azo dyestuffs, such as 2-hydroxy azobenzene, and condensates of salicylaldehyde, such as salicylaldehyde-salicyloyl-hydrazone, salicylaldoxim, salicylaldazine, and salicylaldimine.

Exemplary of the compounds of the present invention are those having the formulae:

Formula 1:

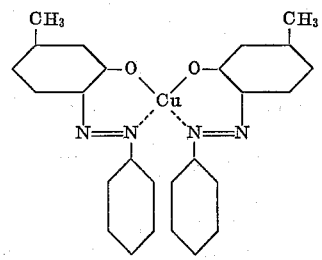

Formula 2:

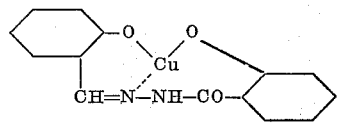

Formula 3:

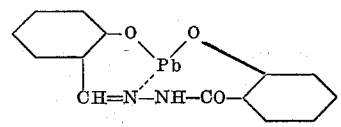

Formula 4:

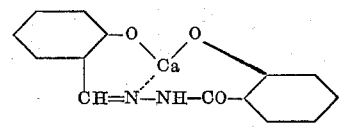

Formula 5:

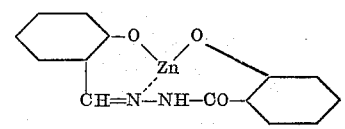

Formula 6:

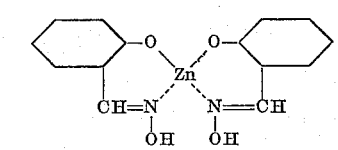

Formula 7:

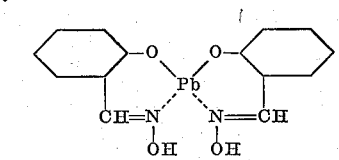

Formula 8:

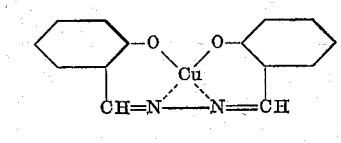

Formula 9:

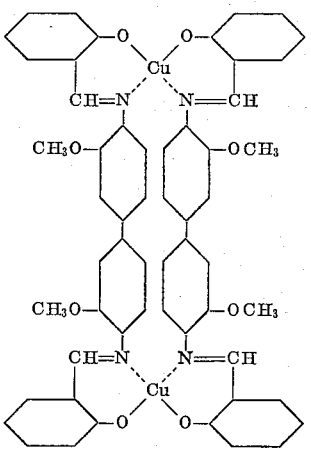

Formula 10:

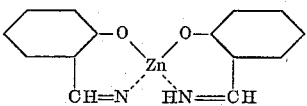

Formula 11:

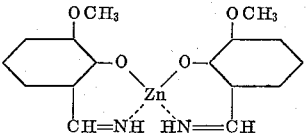

Formula 12:

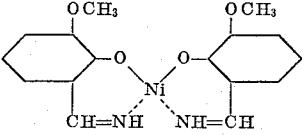

Formula 13:

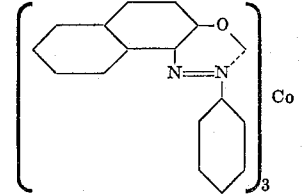

In the following table the precursors of the metal compounds of the above formulae are given. The individual columns are as follows:

(1) The numbers corresponding to the structural formulae of the metal compounds shown above.
(2) The parent o-hydroxy compound of the metal compound.
(3) The metal used for the preparation of the metal compound.
(4) Color of the metal compound.

| 1 | 2 | 3 | 4 |
|---|---|---|---|
| 1 | 2-hydroxy-4-methyl-azobenzene | Copper | Brown. |
| 2 | Salicylaldehyde-salicyloyl-hydrazone | do | Green. |
| 3 | do | Lead | Yellow. |
| 4 | do | Calcium | Do. |
| 5 | do | Zinc | Do. |
| 6 | Salicylaldoxim | do | Colorless. |
| 7 | do | Lead | Yellow. |
| 8 | 2,2'-dihydroxybenzaldazine | Copper | Yellowish-brown. |
| 9 | N,N'-di-(2-hydroxybenzylidene)-dianisidine | do | Brown. |
| 10 | 2-hydroxy-benz-aldimine | Zinc | Yellow. |
| 11 | 2-hydroxy-3-methoxy benz-aldimine | do | Do. |
| 12 | do | Nickel | Do. |
| 13 | 1-benzeneazo-napthol-(2) | Cobalt | Brown. |

The preparation of the precursors of the photoconductor substances is by known processes or analogous to known processes. The conversion into the metal compounds is in general an uncomplicated process.

For the preparation of the metal compounds, solutions of the o-hydroxy compounds in an organic, preferably water-miscible solvent, such as acetic acid or lower alcohols, are advantageously reacted with an aqueous solution of the metal salt. The reaction product separates out and, after a washing process, can be isolated by suction filtration and drying.

For the preparation of the electrophotographic material, the photoconductive metal compounds are advantageously dissolved or suspended in organic solvents such as benzene, acetone, methylene chloride, chloroform, ethylene glycol monomethyl ether or other organic solvents or in mixtures of such solvents, and resins are advantageously added to the solution or suspension. These solutions or suspensions are coated upon the supporting material in the normal manner by immersion, painting, roller-application or spraying. The material is then heated to drive off the solvent.

Mixtures of the compounds of the invention can be applied to the supporting material or they can be applied in association with other photoconductor substances.

Suitable resins for addition to the photoconductor coatings include natural resins such as balsam resins, colophony and shellac, and synthetic resins such as colophony-modified phenol resins and other resins of which colophony constitutes the major part, as well as coumarone resins, indene resins and the substances coming under the collective term "synthetic lacquer resins" to which, according to the Saechtling-Zebrowski "Kunstoff-Taschenbuch," 11th edition,1955, p. 212 et seq., the following belong: processed natural substances such as cellulose ethers, polymers such as vinyl polymers, e.g., polyvinyl-chloride, polyvinylidene chloride, polyvinyl acetate, polyvinyl acetals, polyvinyl ethers, polyacrylic and polymethacrylic acid ester, as also polystyrene, polyisobutylene, chlorinated rubber, polycondensates, e.g., polyesters such as phthalate resin, alkyd resins, maleinate resins, maleic acid modified colophony esters of higher alcohols, as well as phenol-formaldehyde resin, particularly colophony-modified phenol-formaldehyde condensates, urea-formaldehyde condensates, melamine-formaldehyde resins, aldehyde resins, ketone resins, particularly those known as AW 2 resins, xylene-formaldehyde resins, polyamides, and polyadducts, e.g., polyurethanes. Polyolefins, such as various polyethylenes, polypropylenes and phthalic acid polyesters, such as terephthalic acid and isophthalic acid ethylene glycol polyesters are, however, also useful.

If the photoconductive compounds are used in association with resins, the proportion of resin in the photoconductor coating can vary within wide limits. Mixtures ranging from 2 parts of resin and 1 part of photoconductor substance to 2 parts of photoconductor substance and 1 part of resin are preferable. Mixtures of the two substances in equal proportions by weight are particularly useful.

The light-sensitivity of these photoconductor coatings is primarily in the ultra-violet region. It is thus possible with mercury vapor lamps, which emit a great deal of ultra-violet rays, for relatively short exposures to be obtained.

The light-sensitivity of the photoconductor coatings can be increased if optical sensitizers are incorporated therein. For the sensitizing dyestuffs listed below, by way of example, the appropriate page and number in the "Farbstofftabellen" by G. Schultz, 7th edition, 1931, vol. I, is given:

Triarylmethane dyestuffs such as Brilliant Green (No. 760, p. 314), Victoria Blue B (No. 822, p. 347), Methyl Violet (No. 783, p. 327), Ethyl Violet (No. 787, p. 331), Crystal Violet (No. 785, p. 329), Acid Violet 6 B (No. 831, p. 351); xanthene dyestuffs, particularly rhodamines such as Rhodamine B (No. 864, p. 365), Rhodamine 6 G (No. 866, p. 366), Rhodamine G extra (No. 865, p. 366), Sulforhodamine B (No. 863, p. 364) and Fast Acid Eosin G (No. 870, p. 368), as also phthaleins such as Eosin S (No. 883, p. 376), Eosin A (No. 881, p. 374), Erythrosin (No. 886, p. 376), Phloxin (No. 890, p. 378), Bengal Rose (No. 889, p. 378) and Fluorescein (No. 880, p. 373); thiazine dyestuffs such as Methylene Blue (No. 1038, p. 447); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, p. 499), Alizarin Red S (No. 1145, p. 502) and Quinizarine (No. 1148, p. 504); and cyanine dyestuffs, e.g., Cyanine (No. 921, p. 394) and chlorophyll.

For the preparation of copies using the electrocopying material of the invention, the photoconductor coating is charged, e.g., with the aid of a corona discharge taken from a charging apparatus maintained at about 6000–7000 volts. Then, the electrocopying material is either exposed through a master to light or a diascopic or episcopic image of the master is projected thereon. An electrostatic image corresponding to the master is thereby formed on the material and is developed by being contacted with a resin powder consisting of a carrier and a toner. For the carrier, fine glass balls, iron powder or fine plastic balls are particularly suitable. The toner consists of a mixture of resin and carbon black or of a pigmented resin. The toner is, in general, used in a grain size of about 1–100μ. The developer can also consist of a resin or pigment suspended in a dielectric liquid in which resins may be dissolved. The image made visible by the development is fixed, for example, by heating to 100–170° C., preferably 120–150° C., with an infra-red radiator or by treatment with solvent such as trichloroethylene, carbon tetrachloride or ethyl alcohol or steam. In this manner, images are obtained which correspond to the masters and which have good contrast effects.

If transparent supporting material is used, the electrophotographic images can also be used as masters for further copying on any kind of coatings.

Images can also be produced by the reflex process if a translucent supporting material is used for the photoconductor coatings of the invention.

The electrophotographic material of the present invention gives images with good contrast; it can be used particularly for the production of images with background in varying shades of yellow.

The invention will be further illustrated by reference to the following specific examples:

*Example I*

0.5 part by weight of the copper complex of 2-hydroxy-4-methylazobenzene, corresponding to Formula 1 above, and 0.5 part by weight of ketone-aldehyde resin ("Kunstharz AP") are dissolved in 15 parts by volume of chloroform and the solution is coated upon paper which has been pretreated against the penetration of organic solvents. The dried coating is then provided with a negative electric charge, by means of a corona discharge from a charging apparatus maintained at about 6000 volts, exposed beneath a master and a high pressure mercury vapor lamp, and dusted over with a developer in known manner.

The developer consists of a mixture of fine glass balls and a very finely divided resin/carbon black mixture. The black pigmented resin adheres to those portions of the coating not affected by the light during the exposure and an image corresponding to the master becomes visible; this is slightly heated and thereby fixed.

The developer used in the above process consists of 100 parts by weight of glass balls of a grain size of 350–400μ and 2.5 parts by weight of toner of a grain size of 20–50μ. The toner is prepared by melting together 30 parts by weight of polystyrene (Polystyrol LG), 30 parts by weight of resin-modified maleic acid resin ("Beckacite K 105"), and 3 parts by weight of carbon black (Peerless Black 552), the melt being afterwards ground and sieved.

The preparation of the copper complex corresponding to Formula 1 above is as described by P. Pfeiffer et al., "Journal für praktische Chemie," vol. 149 (1937), p. 285.

*Example II*

The coating of paper is effected as described in Example I above and the coating is provided by corona discharge with a positive charge. After exposure to light under a master, the resulting image on a paper foil is developed by powdering over with a developer as described in Example I, but with glass balls coated with a resin, e.g., coumarone resin ("Cumaronharz 601/90"), as the carrier.

*Example III*

The procedure described in Example I is followed by an aluminum foil is coated instead of paper; a firmly adherent coating is similarly formed.

*Example IV*

10 parts by weight of chlorinated polyvinyl chloride ("Rhenoflex"), are dissolved in a mixture of 100 parts by volume of methyl-ethyl-ketone and 50 parts by volume of toluene. 10 parts by weight of the lead complex of salicylaldehyde - salicyloylhydrazone, corresponding to Formula 3 above, are added to this solution and the resulting suspension is very finely ground in a ball mill. This suspension is then coated by means of a pouring device upon paper, which has been pretreated against the penetration of organic solvents, and dried. The preparation of an electrophotographic image is as described in Example I.

For the preparation of the compound corresponding to Formula 3, a solution of 12.6 parts by weight of lead-2-acetate (3H$_2$O) in 100 parts by volume of water is introduced dropwise, with stirring, into a solution of 8.5 parts by weight of salicylaldehyde-salicyloyl-hydrazone in 200 parts by volume of concentrated ammonia. A yellow reaction product separates out; it is filtered off, washed with water and then dried.

*Example V*

The procedure is as in Example IV, but, instead of the metal compound therein used, the same quantity by weight of the copper complex of 2,2' - dihydroxy - benzaldazine, corresponding to Formula 8 above, is used.

The preparation of this copper complex is in accordance with the description given by P. Pfeiffer and H. Pfitzner in the "Journal für praktische Chemie," vol. 145 (1936), p. 255.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising a dyestuff sensitizer for the photoconductor and at least one organic compound containing metal atoms and at least one chelate ring, the compound having the formula

in which X is selected from the group consisting of nitrogen, CH and CO, R is selected from the group consisting of hydrogen, hydroxyl, an aryl group, and a linkage to a nitrogen atom forming part of a ring, A is selected from the group consisting of unsubstituted and non-ionizing group substituted aromatic mono- and polynuclear rings, Me is a polyvalent metal and $n$ is an integer corresponding to the valence of the metal.

2. An electrophotographic material according to claim 1 in which the compound has the formula

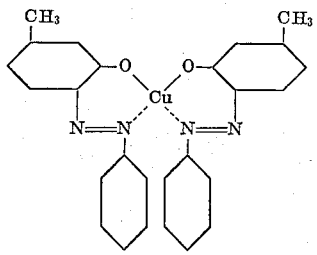

3. An electrophotographic material according to claim 1 in which the compound has the formula

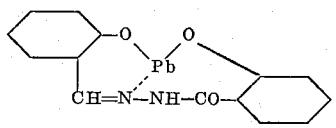

4. An electrophotographic material according to claim 1 in which the compound has the formula

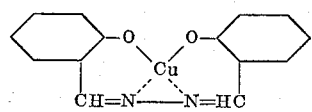

5. An electrophotographic material according to claim 1 in which the compound has the formula

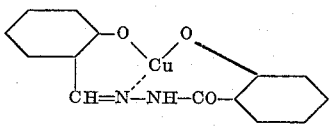

6. An electrophotographic material according to claim 1 in which the compound has the formula

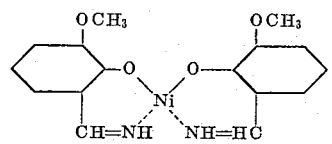

7. A photographic reproduction process which comprises exposing an electrostatically charged, supported photoconductive insulating layer to light under a master and developing the resulting image with an electroscopic, the photoconductive layer comprising at least one organic compound containing metal atoms and at least one chelate ring, the compound having the formula

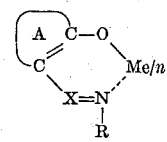

in which X is selected from the group consisting of nitrogen, CH and CO, R is selected from the group consisting of hydrogen, hydroxyl, an aryl group, and a linkage to a nitrogen atom forming part of a ring, A is selected from the group consisting of unsubstituted and non-ionizing group substituted aromatic mono- and polynuclear rings, Me is a polyvalent metal, and $n$ is an integer corresponding to the valence of the metal.

8. A process according to claim 7 in which the photoconductive layer contains a dyestuff sensitizer.

9. A process according to claim 7 in which the compound has the formula

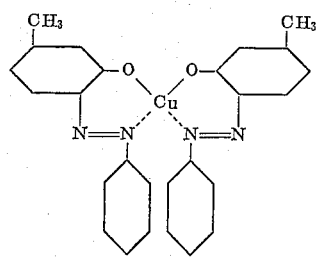

10. A process according to claim 7 in which the compound has the formula

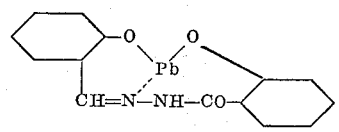

11. A process according to claim 7 in which the compound has the formula

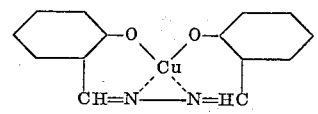

12. A process according to claim 7 in which the compound has the formula

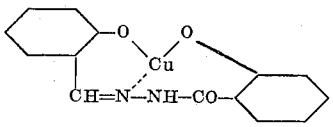

13. A process according to claim 7 in which the compound has the formula

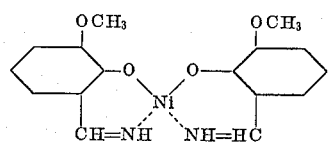

References Cited in the file of this patent
UNITED STATES PATENTS

| | | |
|---|---|---|
| 2,396,328 | Kvalnes et al. | Mar. 12, 1946 |
| 2,825,656 | Walker et al. | Mar. 4, 1958 |

UNITED STATES PATENT OFFICE
CERTIFICATE OF CORRECTION

December 29, 1964

Patent No. 3,163,532

Heinz Schlesinger

It is hereby certified that error appears in the above numbered patent requiring correction and that the said Letters Patent should read as corrected below.

Column 3, Formula 10, the lower right-hand portion of the formula reading:

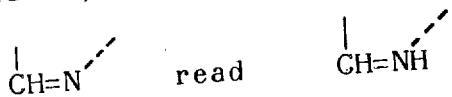

column 6, line 20, for "by" read -- but --; column 7, line 51, after "electroscopic" insert -- material --.

Signed and sealed this 27th day of April 1965.

(SEAL)
Attest:

ERNEST W. SWIDER
Attesting Officer

EDWARD J. BRENNER
Commissioner of Patents